(12) United States Patent
Alajajyan

(10) Patent No.: US 7,107,718 B1
(45) Date of Patent: Sep. 19, 2006

(54) FISHING JIG APPARATUS

(76) Inventor: Harout Alajajyan, 22448 S. Summit Ridge Cir., Chatsworth, CA (US) 91311

( * ) Notice: Subject to any disclaimer, the term of this patent is extended or adjusted under 35 U.S.C. 154(b) by 0 days.

(21) Appl. No.: 11/107,202

(22) Filed: Apr. 18, 2005

(51) Int. Cl.
*A01K 85/00* (2006.01)

(52) U.S. Cl. .................................... 43/42.04; 43/42.39

(58) Field of Classification Search .............. 43/42.04, 43/42.05, 42.08, 42.4, 42.41, 42.36, 42.39, 43/42.45
See application file for complete search history.

(56) References Cited

U.S. PATENT DOCUMENTS

| | | | | |
|---|---|---|---|---|
| 813,718 | A * | 2/1906 | Knowles | 43/42.04 |
| 1,050,759 | A * | 1/1913 | Betts et al. | 43/42.04 |
| 2,102,492 | A * | 12/1937 | Stolley | 43/42.04 |
| 2,110,382 | A * | 3/1938 | Martin | 43/42.04 |
| 2,189,958 | A * | 2/1940 | Middlemiss | 43/42.04 |
| 2,225,676 | A * | 12/1940 | White | 43/42.05 |
| 2,236,353 | A * | 3/1941 | Minser | 43/42.05 |
| 2,246,757 | A * | 6/1941 | Rosegard | 43/42.04 |
| 2,389,883 | A * | 11/1945 | Worden | 43/42.05 |
| 2,459,288 | A * | 1/1949 | Robbins et al. | 43/42.04 |
| 2,476,485 | A * | 7/1949 | Erickson et al. | 43/42.04 |
| 2,497,473 | A * | 2/1950 | Slepica | 43/42.04 |
| 2,503,369 | A * | 4/1950 | Wycech | 43/42.41 |
| 2,517,298 | A * | 8/1950 | Gaylord | 43/42.04 |
| 2,517,299 | A * | 8/1950 | Gaylord | 43/42.05 |
| 2,528,861 | A * | 11/1950 | Clasen et al. | 43/42.05 |
| 2,547,103 | A * | 4/1951 | White | 43/42.04 |
| 2,547,279 | A * | 4/1951 | Henry | 43/42.04 |
| 2,549,463 | A * | 4/1951 | Hansen | 43/42.04 |
| 2,556,205 | A * | 6/1951 | McRoberts | 43/42.04 |
| 2,565,660 | A * | 8/1951 | Krilich | 43/42.04 |
| 2,578,786 | A * | 12/1951 | Davis | 43/42.04 |
| 2,582,627 | A * | 1/1952 | Gaylord | 43/42.05 |
| 2,597,035 | A * | 5/1952 | Rickard | 43/42.4 |
| 2,629,199 | A * | 2/1953 | Larson | 43/42.41 |
| 2,746,200 | A * | 5/1956 | Dale | 43/42.04 |
| 3,006,100 | A * | 10/1961 | Zeman | 43/42.04 |
| 3,494,062 | A * | 2/1970 | Gardner | 43/42.04 |
| 3,685,191 | A * | 8/1972 | Metzger | 43/42.05 |
| 3,685,192 | A * | 8/1972 | Stibbard | 43/42.04 |
| 3,735,518 | A * | 5/1973 | Kleine et al. | 43/42.04 |
| 3,818,626 | A * | 6/1974 | Peippo | 43/42.04 |
| 3,902,265 | A * | 9/1975 | Pond | 43/42.05 |

(Continued)

FOREIGN PATENT DOCUMENTS

FR          2845565 A1 *   4/2004

(Continued)

*Primary Examiner*—Darren W. Ark
(74) *Attorney, Agent, or Firm*—William W. Haefliger

(57) ABSTRACT

Fishing jig apparatus, comprising a lure body, a hook having a stem, and a flexible strand connecting the stem to the lure body, the stem having a portion terminating at a barb, and a clip on the body to releasably retain said portion, whereby during travel of the line in the water, the lure body grasped by a fish will facilitate hooking of the fish proximate the body and release of the hook to remain connected via the strand to the lure as the fisherman reels in the line connected to said body.

4 Claims, 2 Drawing Sheets

U.S. PATENT DOCUMENTS

| | | | |
|---|---|---|---|
| 4,064,646 A * | 12/1977 | Vercellone et al. | 43/42.41 |
| 4,674,226 A * | 6/1987 | Mahan | 43/42.36 |
| 4,819,363 A * | 4/1989 | Parsonage | 43/42.4 |
| 4,823,503 A * | 4/1989 | Tesch | 43/42.04 |
| 4,881,339 A * | 11/1989 | Wirkus | 43/42.04 |
| 4,920,685 A * | 5/1990 | Landuydt | 43/42.04 |
| 4,922,647 A * | 5/1990 | Tompkins | 43/42.45 |
| 4,956,933 A * | 9/1990 | Radtchenko | 43/42.36 |
| 5,113,608 A * | 5/1992 | Hook | 43/42.36 |
| 5,117,574 A * | 6/1992 | Perry | 43/42.36 |
| 5,142,810 A * | 9/1992 | Radtchenko | 43/42.04 |
| 5,862,623 A * | 1/1999 | MacPherson | 43/42.36 |
| 6,115,957 A * | 9/2000 | Bocach | 43/42.36 |
| 6,493,983 B1 * | 12/2002 | Lewko | 43/42.04 |
| 2005/0217166 A1 * | 10/2005 | MacDonald | 43/42.36 |

FOREIGN PATENT DOCUMENTS

| | | | |
|---|---|---|---|
| JP | 9-191795 A | * | 7/1997 |
| JP | 10-248443 A | * | 9/1998 |
| JP | 2001-321023 A | * | 11/2001 |
| JP | 2003-104 A | * | 1/2003 |
| JP | 2003-79278 A | * | 3/2003 |
| JP | 2004-337076 A | * | 12/2004 |

* cited by examiner

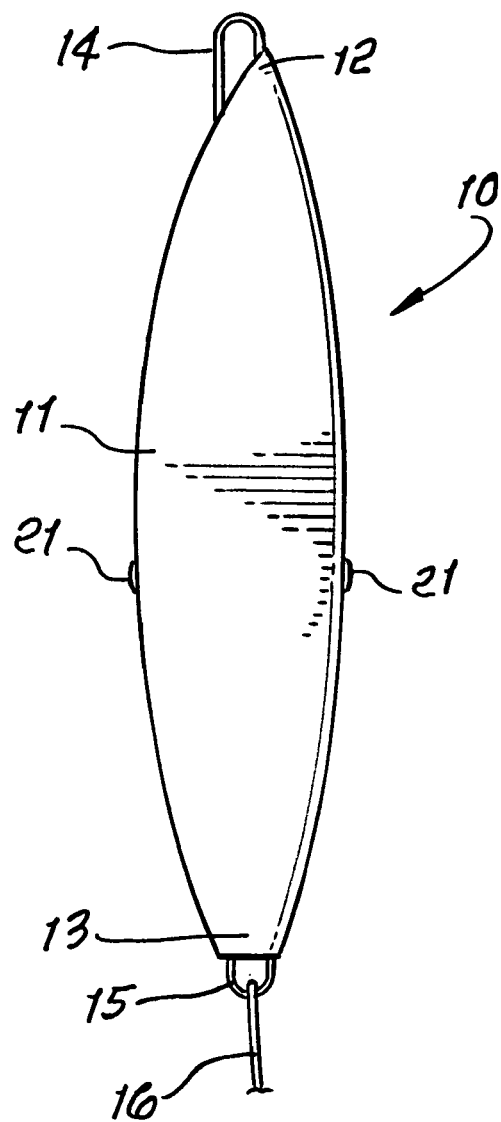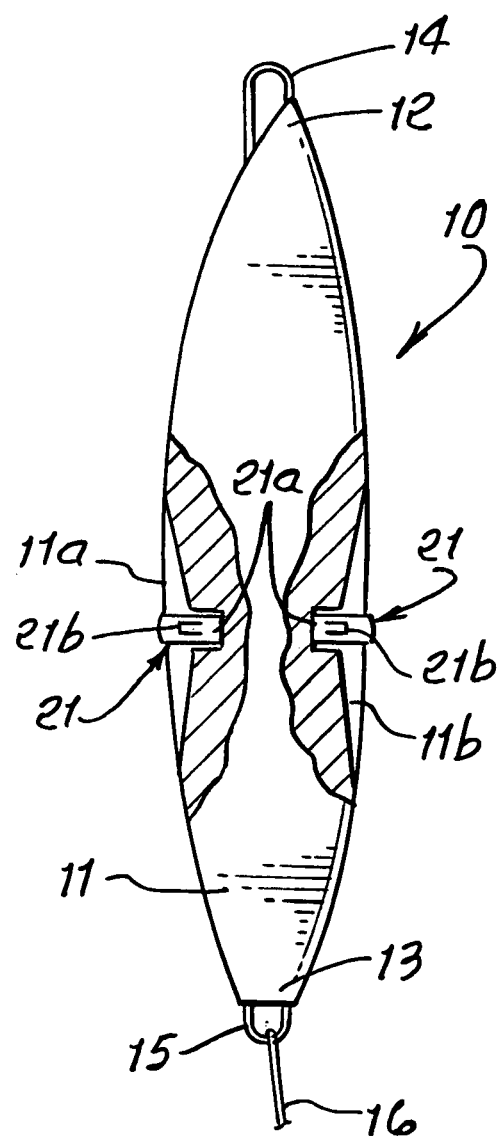

150
FISHING JIG APPARATUS

BACKGROUND OF THE INVENTION

This invention relates generally to fishing lures, and more particularly to improvements in lures enabling hooking of fish in response to and at the time of fish grasping of the lure body, instead of at a hook trailing the lure body, as during "jigging".

There is need for means that will keep a hook or hooks very close to a fishing jig's body, to maximize the chances for a successful strike. There is also need for means that will response to jerking action of the hooked fish by releasing the hook from the fishing jug, or lure body, and will prevent de-hooking during such release.

SUMMARY OF THE INVENTION

It is a major object of the invention to provide a solution to the above problems and that will meet the described needs.

Basically, the invention is embodied by the following:

a) a lure body, b) a hook having a stem, and a flexible strand connecting the stem to the lure, body, c) the stem having a portion terminating at a barb, d) and a clip on the body to releasably retain said portion, e) whereby during travel of the line in the water, the lure body grasped by a fish will facilitate hooking of the fish proximate the body and release of the hook to remain connected via the strand to the lure as the fisherman reels in the line connected to said body.

Another object is to provide a lure body having a side wall recess in which said clip projects. As will be seen, the hook stem portion may be positioned in the side wall recess by the clip, in such manner as to facilitate hook release in response to grasping of the lure body by the fish to become hooked, and to prevent de-hooking.

Another object is to provide a second side wall recess in which another clip projects to retain a stem portion of a second hook. In this regard, a second hook may be provided, and a second flexible strand connecting such stem of the second hook to the lure body. The stem portion of both hooks were typically positioned in the respective first and second recesses, at opposite sides of the lure body.

An additional object is to provide a clip having retention tines that project away from the recess. Such a clip may have an end connected to the lure body inwardly of the recess, whereby the release of the hook is outwardly directed and prevents de-hooking. The lure body typically consists of relatively heavy metal that causes the body to sink relatively rapidly in the water. Also the lure body is typically elongated and has opposite ends, the body tapering toward said opposite ends.

A further object is to provide two cavities on the fishing jig's body so as to receive spring clips that will hold a regular (single) hook or treble hook with enough force, which will enable the fisherman to jig without releasing the hook.

These and other objects and advantages of the invention, as well as the details of an illustrative embodiment, will be more fully understood from the following specification and drawings, in which:

DRAWING DESCRIPTION

FIG. 1 is a side view of a fishing jig lure body, and a hook clip in a side recess;

FIG. 2 is a view like FIG. 1, but showing two clips on the lure body;

DETAILED DESCRIPTION

Figure 3:
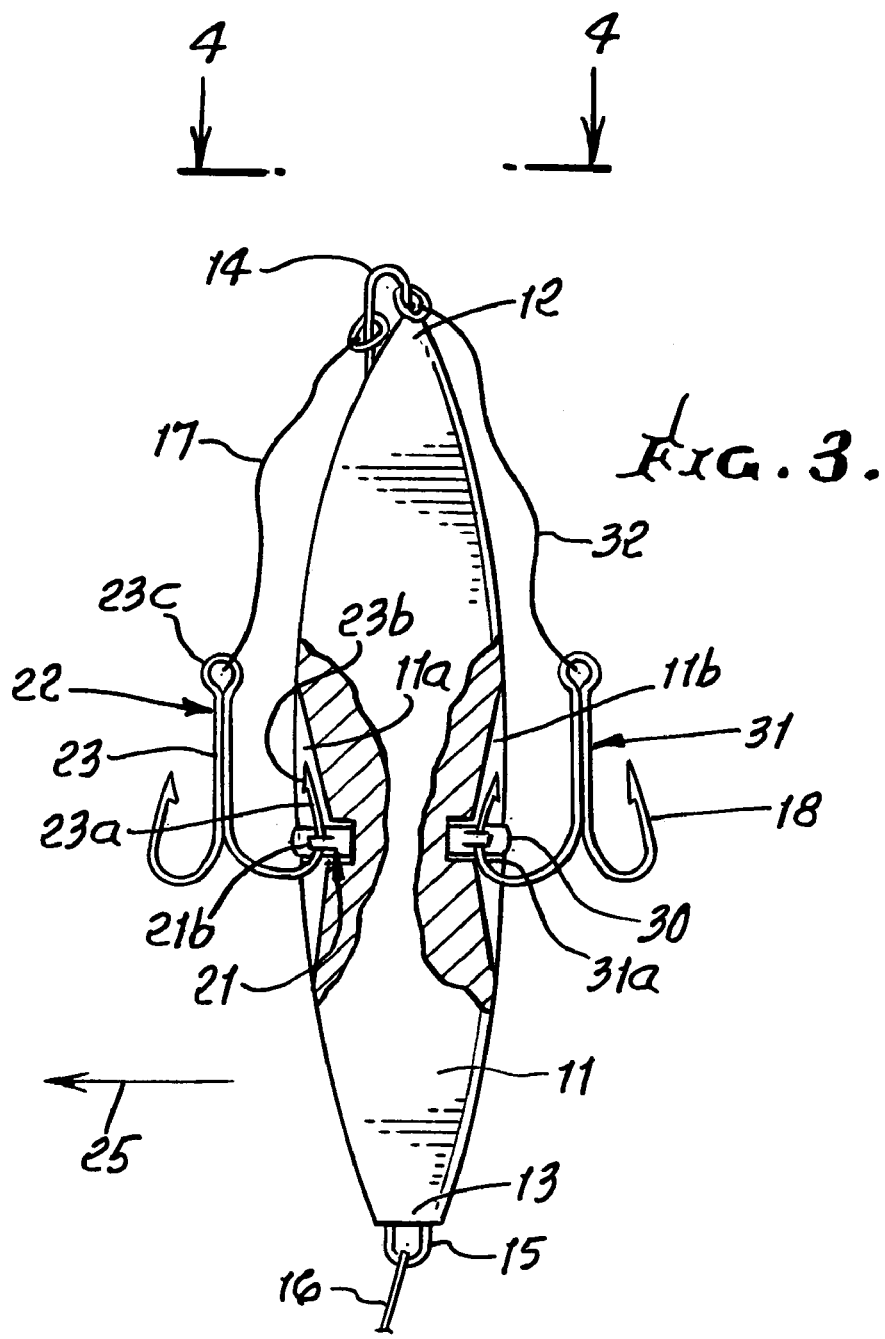
FIG. 3 is a view like FIG. 2, but showing hooks releasably attached to two clips on the lure body.

The drawings, show a preferred form of the invention, as a fishing jig lure 10 having an elongated body 11 extending along longitudinal axis that tapers toward opposite ends 12 and 13. Wire loops 14 and 15 project at such ends for connection to a flexible line 16 leading to a fisherman's reel, and to a short flexible line or lines 17 to which a hook or hooks 22 are terminally attached. In the past, such hooks trail in the water on the body 11 that moves up and down in the water. The body may consist of lead or other heavy metal tending to sink rapidly in the water, during jigging. The fish striking at the body, may or may not become hooked by the trailing hook.

In accordance with the invention a clip 21 is provided on the body, as at a body side, and releasably retains a hook 22, as by retention of a portion 23a of the hook stem 23 near the terminating barb 23b. A flexible short strand 17 connects a loop 23c at the opposite end of the hook stem to the loop 14 at the body end. The configuration is such that during travel of the line in the water, the lure body grasped by a fish will facilitate hooking of the fish proximate the body and release of the hook to remain connected via the strand to the lure as the fisherman reels in the line connected to said body.

The body 11 preferably defines a first side wall recess 11a in which the clip projects. The spring clip typically has an end 21a attached to the lure body, and parallel tines 21b that project in an outward direction (see arrow 25) to assure release of the hook 22 in response to grasping of the lure by the fish and consequent hooking. The hook may be oriented with the barb or barbs projecting as shown, or in the opposite endwise direction.

Figure 4:
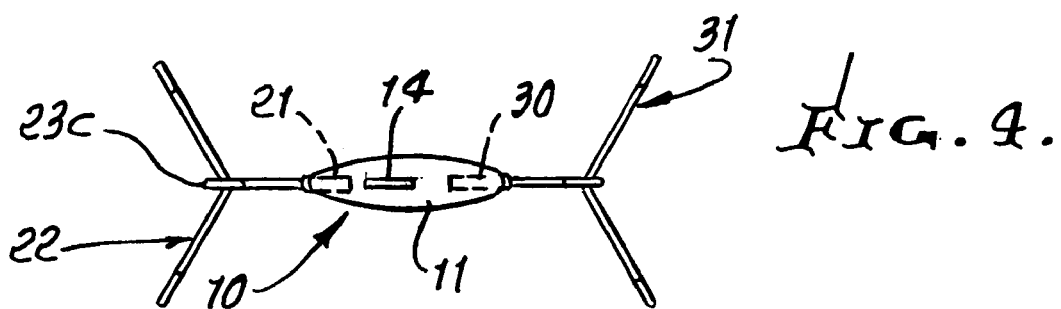
FIG. 4 is a top plan view taken on lines 4—4 of FIG. 3.

Preferably, the body defines a second side wall recess in which another clip projects to retain a stem portion of a second hook. See recess 11b, like recess 11a, but at the opposite sides of the body, to receive a second and like clip 30 that releasably attachs to a second hook 31, as at its stem portion 31a. Drag balance is thereby achieved as the lure body travels through the water. A second flexible strand 32 connects the stem of the second hook to the end of the lure body, as shown. Note that the retained stem portions of the two hooks are positioned in the respective first and second recesses, at opposite sides of the lure body. Those recesses may be in the form of slits or slots in the body, as seen in FIGS. 1 and 4, to orient the steam portion 23a. Maximizing of the chance or chances of hooking of fish, as during "jigging" is thereby achieved.

Note also that each recess is shaped and curved so that the barb spaced from the clip may engage the recess wall, and act as a fulchrum, as the hook is pulled outward, with lever action, to pry the stem loose from the clip tines. This aids in assured hook release and movement to trail the lure in the water, with the fish securely hooked.

I claim:

1. A fishing jig apparatus, comprising:

a) a lengthwise elongated lure body having a longitudinal axis, said body being metallic, b) a first hook having a stem, and a first flexible strand connecting the stem to the lure body,
c) the stem of said first hook having a portion terminating at a first barb,
d) a first clip on the body to releasably retain said stem portion of said first hook,
e) whereby during travel of the lure body in the water when connected to a line, the lure body when grasped by a fish will facilitate hooking of the fish proximate the body and release of the first hook to remain connected via the first strand to the lure body as the fisherman reels in the line connected to said body,
f) said body defining a first side wall recess in which said first clip projects, and said lure body defining a second side wall recess in which a second clip projects, and including a second hook with a stem, and a second flexible strand connecting the stem of the second hook to the lure body, the stem of said second hook having a portion terminating at a second barb, said second clip on the body to releasably retain said stem portion of the second hook,
g) said recesses having inwardly curved shapes which extend toward each other, lengthwise of said body, substantially the entireties of the clips received in the recesses, said recesses being located on opposite sides of the longitudinal axis of said lure body, said first and second clips having both substantially parallel retention tines that project away from the recesses and ends connected to the lure body inwardly of the recesses, and
h) wherein the stem portions of the hooks are positioned in the respective first and second recesses, at the opposite sides of the lure body, to cause the barbs to engage walls of the lure body, to cause the barbs to engage walls defined by the recesses with lever action acting to release the hooks from the clips in response to pulling of the hooks.

2. The apparatus of claim 1 wherein the metallic lure body consists of relatively heavy metal that causes the body to sink relatively rapidly in the water.

3. The apparatus of claim 2 wherein the lure body has opposite ends, the body tapering toward said opposite ends.

4. The apparatus of claim 1 wherein each of the recesses is in the form of a slot, to orient the respective stem portion.

* * * * *